(12) United States Patent
Price et al.

(10) Patent No.: US 9,402,034 B2
(45) Date of Patent: Jul. 26, 2016

(54) ADAPTIVE AUTO EXPOSURE ADJUSTMENT

(75) Inventors: Douglas Scott Price, San Jose, CA (US);
Xiaosong Zhou, Campbell, CA (US);
Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 691 days.

(21) Appl. No.: 13/558,309

(22) Filed: Jul. 25, 2012

(65) Prior Publication Data

US 2013/0027581 A1 Jan. 31, 2013

Related U.S. Application Data (60) Provisional application No. 61/513,384, filed on Jul. 29, 2011, provisional application No. 61/525,566, filed on Aug. 19, 2011, provisional application No. 61/527,512, filed on Aug. 25, 2011.

(51) Int. Cl.
| | |
|---|---|
| *H04N 5/235* | (2006.01) |
| *H04N 19/172* | (2014.01) |
| *H04N 19/169* | (2014.01) |
| *H04N 19/61* | (2014.01) |
| *H04N 19/87* | (2014.01) |

(52) U.S. Cl.
CPC ........... *H04N 5/2351* (2013.01); *H04N 5/2353* (2013.01); *H04N 19/169* (2014.11); *H04N 19/172* (2014.11); *H04N 19/61* (2014.11); *H04N 19/87* (2014.11)

(58) Field of Classification Search
USPC ...................................................... 348/229.1
See application file for complete search history.

(56) References Cited

U.S. PATENT DOCUMENTS

| | | | |
|---|---|---|---|
| 7,688,359 B2 | 3/2010 | Zhao et al. | |
| 7,859,589 B2 | 12/2010 | Yabe | |
| 2005/0259878 A1* | 11/2005 | Drezner et al. | 382/236 |
| 2006/0029265 A1* | 2/2006 | Kim et al. | 382/118 |
| 2009/0103609 A1 | 4/2009 | Jiang et al. | |
| 2009/0160944 A1* | 6/2009 | Trevelyan et al. | 348/187 |
| 2009/0219406 A1* | 9/2009 | Matsuyama | 348/222.1 |
| 2009/0244319 A1* | 10/2009 | Kim et al. | 348/229.1 |
| 2009/0310955 A1* | 12/2009 | Lien et al. | 396/153 |
| 2010/0110279 A1* | 5/2010 | Koguchi et al. | 348/362 |
| 2010/0309987 A1* | 12/2010 | Concion et al. | 375/240.26 |
| 2011/0109758 A1* | 5/2011 | Liang et al. | 348/222.1 |
| 2011/0193990 A1* | 8/2011 | Pillman et al. | 348/229.1 |

OTHER PUBLICATIONS

Kao et al., "Robust Brightness Measurement and Exposure Control in Real-Time Video Recording," IEEE Transactions on Instrumentation and Measurement, 60(4): 1206-1216, Apr. 2011.

* cited by examiner

*Primary Examiner* — Roberto Velez
*Assistant Examiner* — Stephen Coleman
(74) *Attorney, Agent, or Firm* — Baker & Hostetler, LLP (57) ABSTRACT

Techniques for adjusting exposure parameters of a camera such that video data captured by the camera may be coded efficiently. A camera with auto exposure control may capture and output frames of video. A pre-processor may estimate brightness of the frames of the video output from the camera. A controller may estimate a rate of brightness change among the frames, and when the rate of change is lower than a predetermined threshold, the controller may reduce sensitivity of the auto exposure control. A coding engine may predictively code the video.

33 Claims, 7 Drawing Sheets

ADAPTIVE AUTO EXPOSURE ADJUSTMENT

CROSS REFERENCE TO RELATED APPLICATIONS

This application claims the benefit of priority to the following previously filed U.S. provisional patent applications: Ser. No. 61/513,384 filed Jul. 29, 2011, entitled ADAPTIVE AUTO EXPOSURE ADJUSTMENT, Ser. No. 61/525,566 filed Aug. 19, 2011, entitled ADAPTIVE AUTO EXPOSURE ADJUSTMENT, and Ser. No. 61/527,512 filed Aug. 25, 2011, entitled ADAPTIVE AUTO EXPOSURE ADJUSTMENT. These provisional applications are hereby incorporated by reference in their entirety.

BACKGROUND

Aspects of the present invention relate generally to the field of video processing, and more specifically to a predictive video coding system.

In video coding systems, a coder may code a source video sequence into a coded representation that has a smaller bit rate than does the source video and, thereby achieve data compression. A decoder may then invert the coding processes performed by the coder to reconstruct the source video for display or storage.

Frequent exposure adjustments to frames of a video sequence to be coded may lead to inefficient predictive coding since many of the frames may require intra-coding. It can also result in a poor perceptual quality due to the frequent flashing effect resulting from the exposure adjustments. Thus, auto exposure adjustments for every detected luminance change is undesirable. Accordingly, the inventors perceive a need in the art to adapt to changing lighting and image conditions while maintaining proper exposure for frames and minimizing adjustments to the auto exposure features in order to maximize the effectiveness of predictive coding of the captured video.

DETAILED DESCRIPTION

Embodiments of the present invention provide techniques for adjusting exposure parameters of a camera such that video data captured by the camera may be coded efficiently. According to the embodiments, a camera with auto exposure control may capture and output frames of video. A pre-processor may estimate brightness of the frames of the video output from the camera. A controller may estimate a rate of brightness change among the frames, and when the rate of change is lower than a predetermined threshold, the controller may reduce sensitivity of the auto exposure control. A coding engine may predictively code the video.

According to an embodiment, a camera with auto exposure control may capture and output frames of video. A pre-processor may detect a change in motion or image complexity associated with the frames of the video output from the camera. A controller may adjust sensitivity of the auto exposure control when the detected change is above or below predetermined thresholds. A coding engine may predictively code the video.

According to an embodiment, a camera having auto exposure control may capture and output frames of video. A transmitter may detect a change in bandwidth. A controller may adjust the sensitivity of the auto exposure control when the detected change is above or below a predetermined threshold. A coding engine may predictively code the video.

According to an embodiment, a camera may capture and output frames of video. A pre-processor may identify regions of interest from frame(s) in the video, prioritize the regions of interest, and identify a metered area. The metered area may encompass a portion of an identified region of interest with a highest priority. A controller may adjust exposure settings of the camera based on the metered area. A coding engine may predictively code a frame captured by the camera based on the adjusted exposure settings.

Figure 1:
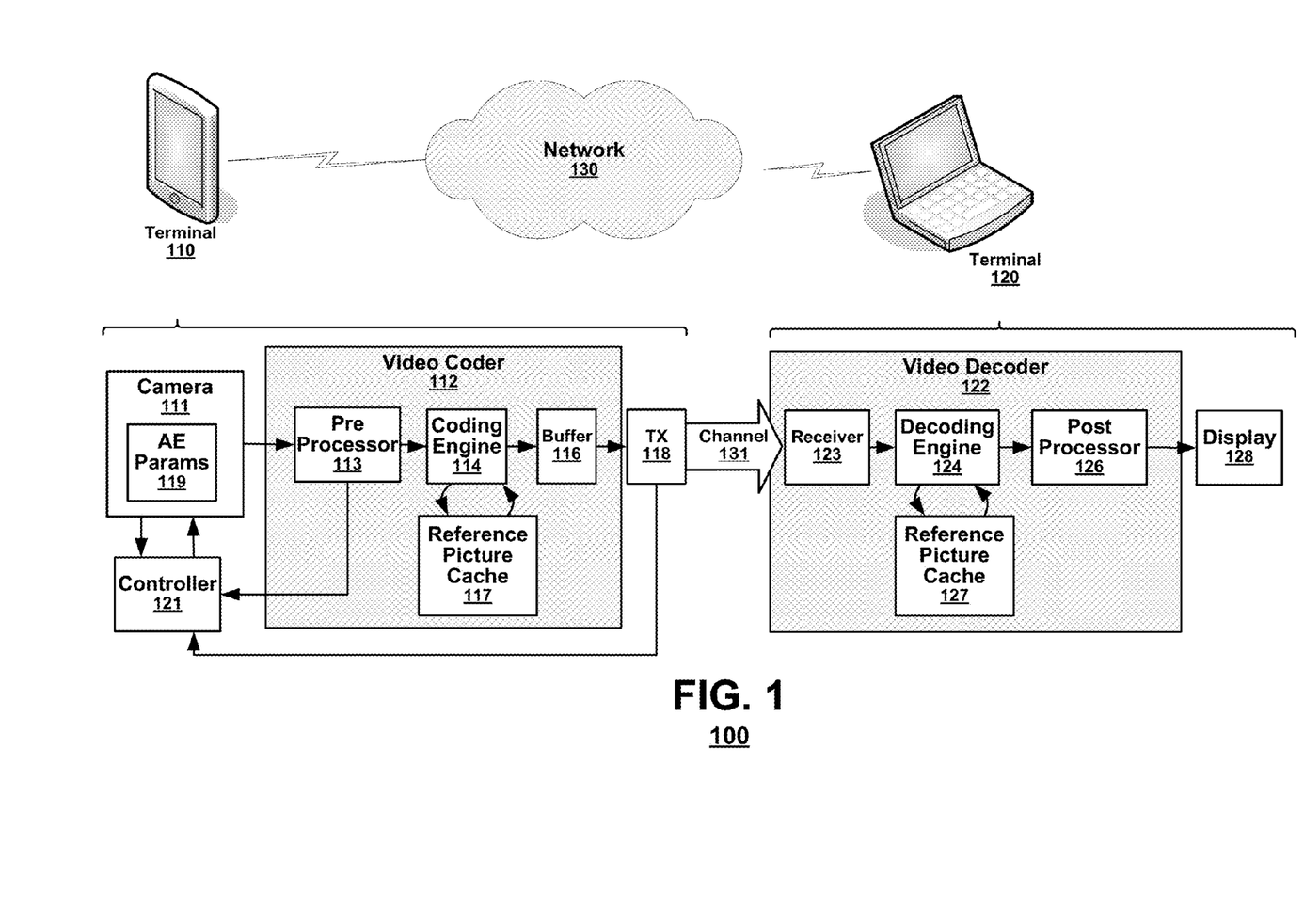
FIG. 1 is a simplified block diagram of a video coding system according to an embodiment of the present invention.

FIG. 1 is a simplified block diagram of a video coding system 100 according to an embodiment of the present invention. The system 100 may include a plurality of terminals 110, 120 interconnected via a network 130. The terminal 110 may capture video data at a local location and code the video data for transmission to the other terminal 120 via the network 130. Terminal 120 may receive the coded video data of the terminal 110 from the network 130, reconstruct the coded data and display video data recovered therefrom.

In FIG. 1, the terminals 110, 120 are illustrated as a smart phone and a laptop computer but the principles of the present invention are not so limited. Embodiments of the present invention find application with personal computers (both desktop and laptop computers), tablet computers, handheld computing devices, computer servers, media players and/or dedicated video conferencing equipment.

The network 130 represents any number of networks that convey coded video data between the terminals, including for example wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 are immaterial to the operation of the present invention unless explained herein below.

The terminal 110 may include a camera 111, a video coder 112, a controller 121, a transmitter 118, and a channel 131. The camera 111 may capture video at a local location for coding. The camera 111 may include auto exposure control to automatically adjust the exposure of frames captured by the camera 111 based on different parameters. The video coder 112 may code video from the camera 111. Coded video is typically smaller than the source video (they consume fewer bits). The controller 121 may adjust one or more of the parameters associated with the auto exposure function of the camera 111. The transmitter 118 may build a channel stream from the coded video data and other data to be transmitted (coded audio, control information, etc.) and may format the channel stream for delivery over the network 130. The transmitter 118 may provide feedback to the controller 121 with information concerning the channel conditions, for example, when the channel is congested and transmissions from buffer output queues are delayed. The channel 131 may deliver the coded data output from the video coder 112 to the decoder 122. Typically, the channel is a transmission channel provided by communications or computer networks, for example, either a wired or wireless network.

The controller 121 may detect lighting changes in the image to be captured by the camera 111 and adjust parameters 119 of the auto exposure function accordingly. In certain situations, the camera 111 may be operate autonomously, and therefore the controller 121 may only alter particular parameters affecting the auto exposure function of camera 111. For example, the controller 121 may alter the auto exposure sensitivity threshold of camera 111. With auto exposure, the camera 111 may adjust shutter speed of the camera lens to adjust the light exposure or brightness of the image. Auto exposure control may also adjust exposure window location or size, adjust an analog or digital gain, increase the integration time, use additional lighting sources, or other known method of exposure control.

The video coder 112 may include a pre-processor 113, a coding engine 114, a buffer 116, and a reference picture cache 117. The pre-processor 113 may accept source video from the camera 111 and may perform various processing operations on the source video to condition it for coding. The coding engine 114 may code processed frames according to a variety of coding modes to achieve bandwidth compression. The reference picture cache 117 may store frame data that may represent sources of prediction for later-received frames input to the video coder 112. The buffer 116 may store the coded data until it is combined into a common bit stream to be delivered by the transmission channel 131 to a decoder 122 or terminal 120.

The pre-processor 113 may receive source video from the camera 111 and may separate the source video into frames. The pre-processor 113 may perform video processing operations on the frames including filtering operations such as de-noising filtering, bilateral filtering or other kinds of processing operations that improve efficiency of coding operations performed by the coder 112. Typically, the pre-processor 113 may analyze and condition the source video for more efficient compression.

The coding engine 114 may select from a variety of coding modes to code the video data, where each different coding mode yields a different level of compression, depending upon the content of the source video. In some video coding systems, a coder may code each portion of an input video sequence (for example, each pixel block) according to multiple coding techniques and examine the results to select a preferred coding mode for the respective portion. For example, the coding engine might code the pixel block according to a variety of prediction coding techniques, decode the coded block and estimate whether distortion induced in the decoded block by the coding process would be perceptible. Each frame may be coded according to any of a variety of different coding techniques to achieve bandwidth compression (e.g., temporal/motion predictive encoding). Using predictive coding techniques, a motion-compensated prediction algorithm reduces spatial and temporal redundancy in the video stream by exploiting spatial and temporal redundancies in a sequence of frames. Some frames, blocks, or macroblocks in a video stream may be coded independently (intra-coded I-frames). A frame may be primarily inter-coded but contain intra-coded pixel blocks. The transmission of an I-frame or I-block requires a relatively large amount of data as compared to frames or blocks coded by inter-frame compression. Some frames, blocks, or macroblocks may be coded using other frames or blocks as reference frames (inter-coded frames, e.g., P-frames or B-frames). P-frames may be coded with reference to a previous frame or block and B-frames may be coded with reference to previous and subsequent frames (Bi-directional). Inter-frame coding achieves a higher level of compression and fewer bits per frame as compared to intra-coding.

In some situations, adjusting the camera exposure based on overall scene brightness can result in undesired exposure as the scene can potentially have a very wide dynamic range, with certain parts of the scene being very bright and others being very dark. Certain regions of an image may be considered to have a higher priority for proper exposure. These may be referred to as the regions of interest (ROI). When the luminance of an ROI differs significantly from the overall scene due to a back-lit scene, a front-lit scene, or other similar scenario, a change in the exposure to accommodate the scene lighting may obscure the ROI. Lighting changes that accommodate the ROI luminance rather than the whole scene may result in perceptible errors and unnecessary intra-coding of subsequent frames if the ROI has moved or a previously detected ROI is lost. Because an exposure adjustment may change the brightness of an image, predictive coding may not be effective and the over or under exposed frame may require intra-coding. Thus, repeated exposure adjustments may require excessive intra-frame coding, thereby limiting the benefit gained by predictively coding received video frames.

The reference picture cache 117 may store a predetermined number of reference frames. The reference picture cache 117 may have a predetermined cache depth; for example, video coders operating in accordance with H.264 may store up to sixteen (16) reconstructed reference pictures.

The terminal 120 may include a video decoder 122 and a display 128. The video decoder 122 may decode coded video received from the channel 131. The display 128 may display the decoded video. In some implementations, a terminal 120 need not include a display; it may store reconstructed video for later use.

The video decoder 122 may include a receiver 123, a decoding engine 124, a post-processor 126, and a reference picture cache 127. The receiver 123 may receive coded video data from the channel 131 and store the received data to be decoded by the decoding engine 124. The decoding engine 124 may decode the coded video data to recover the original source video data. The post-processor 126 may apply other signal conditioning operations to the recovered video prior to output. For example, the post-processor 126 may apply filtering, de-interlacing, scaling or other processing operations on the decompressed sequence that may improve the quality of the video displayed. The processed video data may be displayed on a screen or other display 128 or may be stored in a storage device (not shown) for later use.

The reference picture cache 127 may store frame data that may represent sources of prediction for later-received frames input to the video decoding system. That is, recovered video of reference frames may be stored in the reference picture cache 127 for use by the decoding engine 124 when decoding later-received coded video. The reference picture cache 127 may have a predetermined cache depth that matches the depth of the reference picture cache 117 of the coder 112.

The decoding engine 124 may perform decoding operations that invert coding operations performed by the coding engine 114 of the video coder 112. The decoding engine 124 may perform entropy decoding, dequantization and transform decoding to generate recovered pixel block data. Quantization/dequantization operations are lossy processes and, therefore, the recovered pixel block data likely will be a replica of the source pixel blocks that were coded by the video coder 112 but include some error. For pixel blocks coded predictively, the transform decoding may generate residual data; the decoding engine 124 may use motion vectors associated with the pixel blocks (which may be implied in some cases) to retrieve predicted pixel blocks from the reference picture cache 127 to be combined with the prediction residuals. Reconstructed pixel blocks may be reassembled into frames and output to the post-processor 126.

As discussed, the elements shown in FIG. 1—the camera 111, video coder 112, video decoder 122 and display 128—all support delivery of video data in only one direction, from terminal 110 to terminal 120. The principles of the present invention may be extended to bidirectional exchange of video data, in which case these functional blocks may be replicated to support delivery of video data from terminal 120 to terminal 110, not shown in FIG. 1. Thus, the terminal 120 may include its own camera and video coder and the terminal 110 may include its own video decoder and display. Although similarly provisioned, the video coder/decoder pairs may operate independently of each other. Therefore, pre-processing operations 113 and post-processing operations 126 of a first video coder/decoder pair 112/122 may be selected dynamically with regard to the video content being processed in one direction. Pre-processing operations and post-processing operations of a second video coder/decoder pair may be selected dynamically with regard to the video content being processed by the second pair and without regard to the video content being processed by the first pair 112/122.

Figure 2:
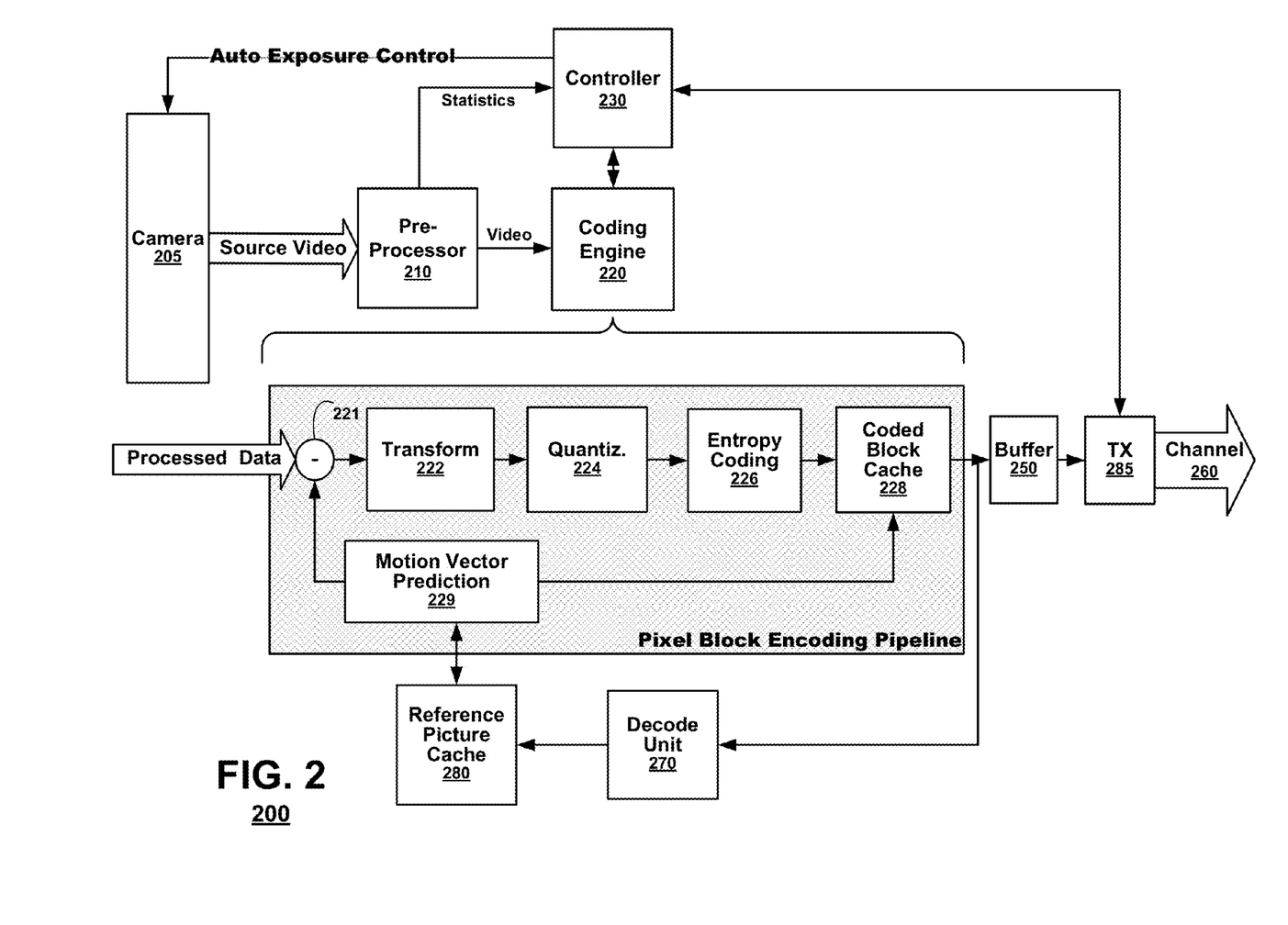
FIG. 2 is a simplified block diagram of a video coder according to an embodiment of the present invention.

FIG. 2 is a simplified block diagram of a video coder 200 according to an embodiment of the present invention. The coder 200 may include a camera 205, pre-processor 210, a coding engine 220, a controller 230, a buffer 250, a transmitter 285, a decode unit 270, and a reference picture cache 280. The camera 205 may capture video data for coding. The pre-processor 210 may receive the input video data from the camera 205 and prepare the video for coding. The controller 230 may receive image statistics about the video frames from the pre-processor 210 and determine appropriate exposure parameters for the camera 205 and coding modes for the video frames. The coding engine 220 may receive video output from the pre-processor 210 and generate compressed video in accordance with coding mode parameters received from the controller 230. The buffer 250 may store the coded data until it is combined into a common bit stream. The transmitter 285 may build a channel stream from the coded video data and other data to be transmitted (coded audio, control information, etc.) and may format the channel stream to be delivered by a transmission channel 260 to a decoder or terminal. The transmitter 285 may provide feedback to the controller 230 with information concerning the channel conditions, for example, when the channel 260 is congested and transmissions from the buffer 250 output queues are delayed. The decoding unit 270 may reconstruct the compressed video. The reference frame cache 280 may store reconstructed frame data to be used as sources of prediction for later-received frames input to the coder 200.

The camera 205 may have an auto exposure function to adjust shutter speed of the camera lens, adjust exposure window location or size, adjust an analog or digital gain, increase the integration time, use an additional lighting sources, or other known method of exposure control to adjust the light exposure or brightness of the captured images. Captured video is passed to the coding engine 220 as a sequence of video frames, each frame depicting a still image of the captured scene.

The pre-processor 210 may detect exposure changes in the frames received or in the brightness of the pixel blocks. The pre-processor 210 may additionally provide analytics that identify information about the received video data. For example, the pre-processor 210 may identify the content of the image, detect significant objects in the image, estimate complexity of the image, detect the amount of motion in an image, or determine a scene type for the image. This information may then be passed to the controller 230.

The controller 230 may receive information from the pre-processor 210, the coding engine 220, or the transmitter 285 that may be used in adjusting the auto exposure parameters of the auto exposure function of camera 205.

The controller 230 may set high level operational parameters which affect the coding processes of the coding engine 220. Based on the high level operational parameters set by the controller 230, control processes of coding engine 220 may access the reference frames stored in the reference frame cache 280, and for each pixel block in a frame, the control processes of coding engine 220 may select a coding mode to be utilized by the coding engine 220 and may control operation of the coding engine 220 to implement each coding mode.

The controller 230 may set the camera's responsiveness to exposure changes which may affect the coding of the frames. For example, by reducing the sensitivity to exposure changes, the controller 230 may cause predictive coding of some over or under exposed frames. Similarly, the controller 230 may determine that a heightened sensitivity to exposure changes may be appropriate in order to improve image quality. Then, with a heightened sensitivity, a small change in brightness between a first and a second frame may cause the second frame to be intra-coded.

The controller 230, based on information provided by the pre-processor 210, may additionally detect and track ROIs and adjust the auto exposure parameters of the camera upon detecting a lighting or ROI change. An object or area in the captured image may be identified as an ROI by default, e.g. the center of the frame, or detected based on the content of the image. Objects that may be identified as ROIs include high-textured areas, objects of interest, e.g. a face or group of faces, or the focus of the captured image.

The controller 230 may serve as an ROI classifier that does a per-scene dynamic determination of the ROI and determines the auto exposure priority of each ROI based on the ROI criteria and overall scene brightness. ROIs may be identified and prioritized for each scene or frame. ROIs may be prioritized based on: size, location, stability, confidence of the controller in the location of the ROI, detected motion of the ROI object, hue, luminance, number of ROIs in the frame, a classification of the ROI object (e.g. whether the ROI contains a face), or other feature of the ROI or the captured image. ROI classification may be use case or application specific or may be otherwise determined by the contents of the captured image.

An area around the ROI having the highest priority may be metered to ensure the priority ROI is always properly exposed. The metered area may cover multiple ROIs. To accommodate miscalculations of the ROI without unnecessarily adjusting the exposure settings, significant changes in the determined ROI may be prevented between frames. Significant changes in detected ROIs may be prevented by detecting and predicting ROIs from previous or future ROIs to avoid miscalculation, modifying the shape of an ROI based on its type classification, and/or making minimal adjustments to the detected ROI between frames using known object parameters such as hue or size.

Significant changes in overall exposure of the scene and overall exposure of the ROI may also be prevented. ROIs may be dynamically adjusted to include significant areas outside the ROIs such that, when the ROI is lost, an abrupt exposure change does not occur. The detected scene brightness may be weighted such that the overall brightness is biased towards the appropriate luminance for the ROI(s). A back-lit or front-lit scene may be detected and the metered area adjusted to weight heavier on the ROI when these occur and weight less heavily on the ROI when using a less extreme scenario. Insignificant changes in a metered area may be ignored or eliminated. For example, the auto exposure sensitivity may be altered such that the exposure settings may be adjusted only upon significant lighting changes. The detected ROI area may be transitioned when an ROI is lost or eliminated. For example, the area of the frame metered to accommodate an ROI may be slowly moved to a second area of the frame considered important, such as the center, or another detected ROI. The transition may include a growing or general morphing of the metered area to maintain exposure stability and avoid intra-coding. Furthermore, when the ROI is lost or eliminated, the metered area may be transferred instantly to center using a possibly larger window. This can help reduce flickering of the exposure by only changing the metering area once.

Exposure adjustments determined based on detected luminance in a scene or image may result in over or under exposure for certain lighting conditions. For example, adjustments to the exposure for the scene may be improper as a result of the coloring and luminance of objects in the scene, e.g. when a significant area, object or detected ROI is centered on a bright light or a black surface. Proper exposure may be achieved using dynamic adjustment of the target exposure using camera, scene or image data. For example, the target exposure may be adjusted responsive to analyzing camera metadata such as brightness and signal to noise ratio, identifying and distinguishing between the coloring or luminance of the scene's objects and the amount of lighting in the scene, and/or identifying specific scene types such as outdoor scenes or portraits.

The coding engine 220 may include a subtractor 221, a transform unit 222, a quantizer unit 224, an entropy coder 226, a coded block cache 228, and a motion predictor 229. The subtractor 221 may generate data representing a difference between the source pixel block and a reference pixel block developed for prediction. The subtractor 221 may operate on a pixel-by-pixel basis, developing residuals at each pixel position over the pixel block. The transform unit 222 may convert the source pixel block data to an array of transform coefficients, such as by a discrete cosine transform (DCT) process or a wavelet transform. The quantizer unit 224 may quantize (divide) the transform coefficients obtained from the transform unit 222 by a quantization parameter Qp. The entropy coder 226 may code quantized coefficient data by run-value coding, run-length coding or the like. Data from the entropy coder 226 may be output to the channel 260 as coded video data of the pixel block. The motion predictor 229 may search the reference picture cache 280 for stored decoded frames that exhibit strong correlation with the source pixel block. When the motion predictor 229 finds an appropriate prediction reference for the source pixel block, it may generate motion vector data that is output to a decoder as part of the coded video data stream. The motion predictor 229 may retrieve a reference pixel block from the reference cache 280 and output the reference pixel block to the subtractor 221 (via scalar and adder).

The coding engine 220 may operate according to a predetermined protocol, such as H.263, H.264, MPEG-2. In its operation, the coding engine 220 may perform various compression operations, including predictive coding operations that exploit temporal and spatial redundancies in the input video sequence. The coded video data, therefore, may conform to a syntax specified by the protocol being used.

Figure 3:
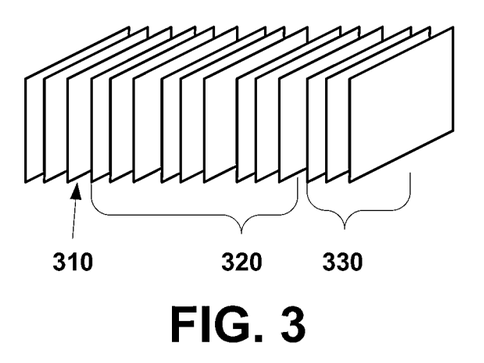
FIG. 3 is a simplified diagram illustrating integration of an exposure change in an exemplary sequence of frames according to an embodiment of the present invention.

FIG. 3 is a simplified diagram illustrating integration of an exposure change in an exemplary sequence of frames according to an embodiment of the present invention. A condition necessitating an exposure change may be detected from metadata recorded when capturing a frame 310. The exposure change may be integrated gradually over a set of frames 320. Once the exposure change is fully integrated, the frames captured after that point 330 may be exposed at the new exposure settings. The number of frames over which the exposure change is integrated 320 may affect the number of frames which require intra-coding. As the number of frames over which the exposure change is integrated 320 increases, the change in exposure between consecutive frames is more gradual, and as a result, a smaller number of frames from the set of frames 320 need to be intra-coded.

Figure 4:
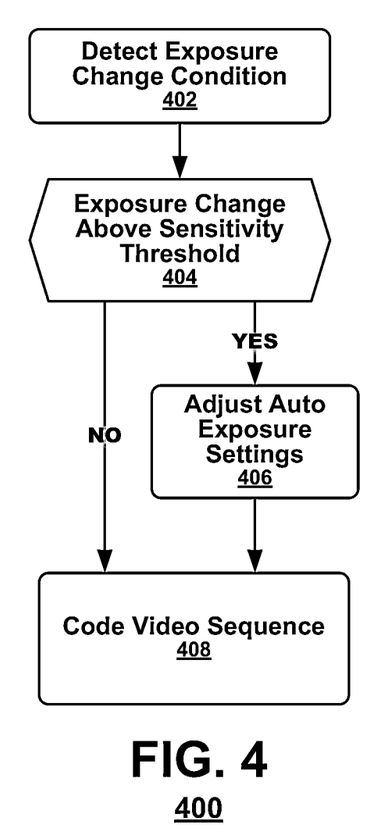
FIG. 4 is a simplified flow diagram illustrating a method for coding a sequence of frames with an adjustment for exposure changes according to an embodiment of the present invention.

FIG. 4 is a simplified flow diagram illustrating a method 400 to code a sequence of frames with an adjustment for exposure changes according to an embodiment of the present invention. The method 400 may determine whether a change in exposure change conditions are detected by a controller (box 402). The method 400 may then evaluate whether the detected change is significant enough to change parameters affecting the auto exposure settings of a camera by comparing amount of change with a predetermined sensitivity threshold (box 404). If the change is greater than the sensitivity threshold, the parameters affecting the auto exposure settings may be adjusted. The adjustment of the parameters affecting the auto exposure may change the shutter speed of the camera lens, the exposure window location or size, analog or digital gain, the integration time, and/or the use of additional lighting sources. According to an embodiment, a parameter adjusted may be a sensitivity threshold of an auto exposure function of the camera. If the change is less than the sensitivity threshold, no change in the auto exposure settings may be initiated. The video sequence may then be coded at the current auto exposure settings (box 408).

Figure 5:
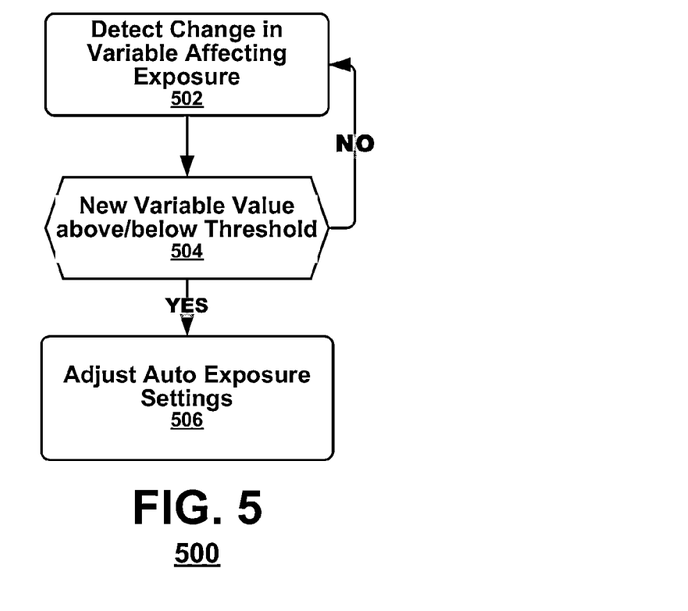
FIG. 5 is a simplified flow diagram illustrating a method for adjusting the auto exposure settings of a sequence of frames according to an embodiment of the present invention.

FIG. 5 is a simplified flow diagram illustrating a method 500 for adjusting the auto exposure settings of a sequence of frames responsive to a change in a variable affecting exposure according to an embodiment of the present invention. The method 500 may detect a change in the variable affecting exposure (box 502). The method 500 may evaluate whether the detected change is significant enough to change the auto exposure settings (504). The change may be considered significant if the variable value falls below or increases above a particular threshold. If the detected change is significant enough, the auto exposure settings may be adjusted (box 506).

The variable affecting exposure may include bandwidth, motion, and/or image complexity. A change in bandwidth, motion, and/or image complexity may be communicated to a controller and the controller may adjust the parameters of a camera as described above in the discussion pertaining to FIG. 2. According to an embodiment, a parameter adjusted may be a sensitivity threshold of an auto exposure function of the camera. If the bandwidth available for transmitting coded frames increases above a particular threshold, the auto-exposure settings may be adjusted to utilize the extra bandwidth. In an embodiment, responsive to the increased bandwidth, the number of frames available for integrating exposure changes may be decreased. Although this may increase the number of intra-coded frames as explained in the discussion pertaining to FIG. 3, the extra bandwidth available may accommodate the increase in the number of intra-coded frames. In an embodiment, responsive to the increased bandwidth, the exposure window size may be decreased to provide more accurately exposed images while utilizing the increased bandwidth. In a further embodiment, responsive to the increased bandwidth, the sensitivity of the camera to light/luminance may be increased to provide more accurately exposed images while utilizing the increased bandwidth. Similarly, if the bandwidth available for transmitting frames decreases below a particular threshold, the auto-exposure settings may be adjusted for optimal operation given the limited bandwidth. For example, responsive to the decreased bandwidth, the number of frames available for integrating exposure changes may be increased, the exposure window size may be increased, and/or the sensitivity of the camera to light/luminance may be decreased.

If image complexity increases above a particular threshold, the auto-exposure settings may be adjusted. In an embodiment, responsive to the increased image complexity, the number of frames available for integrating exposure changes may be increased. Typically, frames with complex images require more bandwidth since additional bits pertaining the complexity have to be transmitted. Therefore, the number of bits available for frequent auto exposure changes may be limited. As a result, the number of frames integrating exposure changes may be increased so that the bits transmitted for auto exposure changes are minimized. In an embodiment, responsive to the increased image complexity, the exposure window size may be increased to decrease the frequency of auto exposure changes. In a further embodiment, responsive to the increased image complexity, the sensitivity of the camera to light/luminance may be decreased to decrease the frequency of auto exposure changes. Similarly, if the image complexity decreases below a particular threshold, the auto-exposure settings may be adjusted for optimal operation given that more bits may be available to code auto exposure changes. For example, responsive to the decreased image complexity, the number of frames available for integrating exposure changes may be decreased, the exposure window size may be decreased, and/or the sensitivity of the camera to light/luminance may be increased.

If camera motion increases above a particular threshold, the auto-exposure settings may be adjusted. In an embodiment, responsive to the increased camera motion, the number of frames available for integrating exposure changes may be decreased. Typically, frames captured while the camera is moving may not have adequate reference frames, and therefore have to be intra-coded. Since the frames have to be intra-coded anyway, the number of frames integrating exposure changes may be decreased to utilize the intra-coding. In an embodiment, responsive to the increased camera motion, the exposure window size may be decreased to provide more accurately exposed images while utilizing the intra-coded frames resulting from the camera motion. In a further embodiment, responsive to the increased camera motion, the sensitivity of the camera to light/luminance may be increased to provide more accurately exposed images while utilizing intra-coded frames resulting from the camera motion. Similarly, if the camera motion decreases below a particular threshold, the auto-exposure settings may be adjusted for optimal operation given that the frames will likely be inter-coded. For example, responsive to the decreased camera motion, the number of frames available for integrating exposure changes may be increased, the exposure window size may be increased, and/or the sensitivity of the camera to light/luminance may be decreased.

Figure 5B:
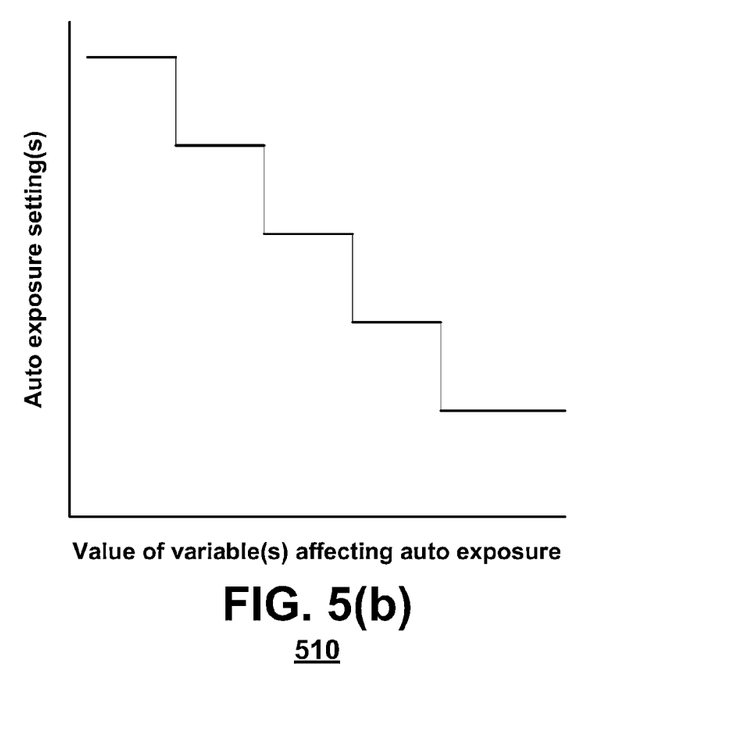
FIG. 5(b) is an exemplary function illustrating changes to auto exposure settings according to an embodiment of the present invention.

FIG. 5(b) is an exemplary function illustrating the changes to auto exposure settings responsive to changes in variables affecting auto exposure according to an embodiment of the present invention. For example, as the value of a variable such as bandwidth or camera motion increases above any one of several predetermined thresholds, the value of one or more factors affecting auto exposure settings such as exposure window size and/or number of frames available for integrating exposure changes may decrease to predetermined levels. In other embodiments, the function may vary based on the relationship between the variable(s) and the auto exposure setting(s) as explained in the discussion relating to FIG. 5 above.

Figure 6:
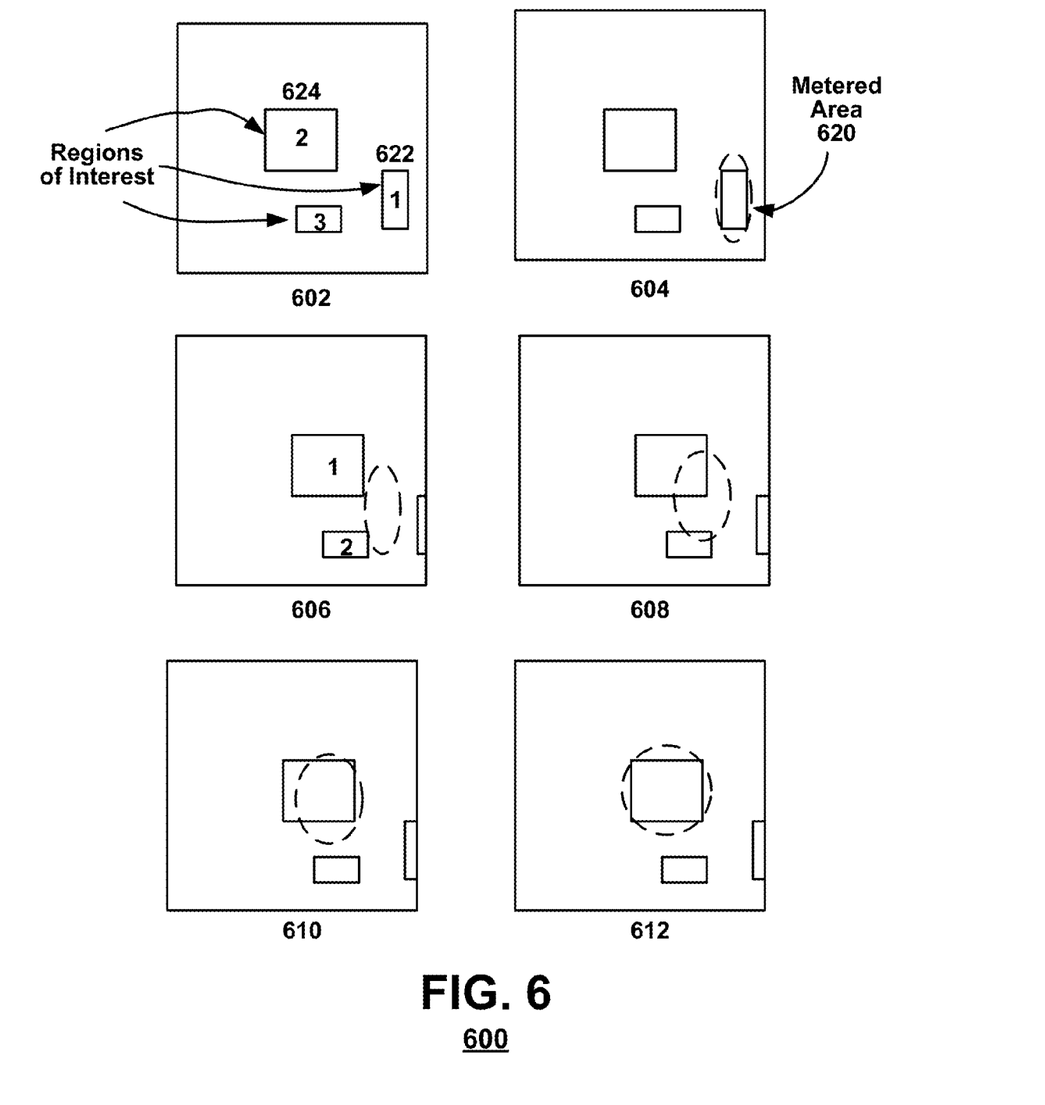
FIG. 6 is a simplified diagram illustrating an exemplary sequence of frames with the metered area adjusted based on detected regions of interest according to an embodiment of the present invention.

FIG. 6 is a simplified diagram illustrating an exemplary sequence of frames with the metered area adjusted based on a change in the detected ROI according to an embodiment of the present invention. A change in detected ROI may be communicated to a controller and the controller may adjust the parameters of a camera as described above in the discussion pertaining to FIG. 2. According to an embodiment, a parameter adjusted may be a sensitivity threshold of an auto exposure function of the camera. Frame 602 may have multiple detected ROIs each having a priority. The priority may identify the most important ROI and the exposure settings of the camera may be set to ensure the proper exposure in subsequent frames 604-612 for the ROI with the highest priority 622. As shown in frame 604, a metered area 620 may be identified for the scene such that the auto exposure parameters are set to accommodate the metered area 620. For example, the metered area 620 may be given a greater weight than the rest of the frame when the frame is evaluated to determine the proper exposure settings. Then, the lighting details for the rest of the frame will have minimal impact on exposure settings as compared to the lighting details for the metered area 620.

As shown in frame 606, the scene may change such that the ROI priorities change. For example, the ROI with the highest priority 622 may no longer be detected if the object moved out of the field of view or was otherwise lost, or an ROI with a higher priority may be detected. According to an embodiment, new priorities may be evaluated and the metered area may then be moved to encompass an ROI with the next highest priority or other known area of interest, for example, the center of the frame. Frames 608-612 illustrate transitional frames used to slowly move and morph the metered area 620 from the first location on the frame, around the original high priority ROI 622, to a second location in the frame, around the newly detected highest priority ROI 624. The slow adjustment of the metered area 620 may allow the exposure settings to remain relatively stable and avoid the necessity of intra-coding the frame.

In some instances, the metered area 620 may not be immediately adjusted upon loss of an associated ROI. For example, if the ROI has been stable and consistently located for a first sequence of frames or for a first period of time, then the confidence in the location of the ROI may be high. If the ROI is suddenly no longer detected, the metered area 620 may remain consistent for a sequence of subsequent frames or for a second period of time, or until a change condition occurs or is otherwise detected.

The ROI can use multiple sets of classifiers to determine confidence in a detected ROI location. The first set of classifiers can be used to initially find or to move the ROI to a new location and can be more stringent. A secondary, more lenient set which signifies the ROI may still be present, but at lower confidence, and can be used to maintain the position of the ROI even if the first set of classifiers fails. The maintaining of the ROI using the second set can prevent flickering of the exposure caused by constantly finding and losing the ROI. If the confidence level is sufficiently high, the auto exposure controls may be locked. Then the exposure will not be affected by a loss of a detected ROI or by a small change in lighting conditions for the frame.

If the auto exposure controls are locked, the luminance and exposure adjustments for the image may only be changed upon either a) a significant change in lighting conditions that persists for a third sequence of frames or a third period of time; or b) the ROI remains undetected or lost for a fourth sequence of frames or a fourth period of time. Alternatively, if multiple sets of confidence classifiers are utilized, the auto exposure controls may remain locked if an ROI remains undetected until a) there is a significant luminance change; or b) both sets of confidence classifiers fail indicating that the ROI is lost.

According to an embodiment, the fourth period of time may be greater than the third period of time, and the first period of time may be significantly greater than the fourth period of time. For example, the first period of time may be approximately 30 seconds whereas the third period of time may be approximately 0.8 seconds and the fourth period of time may be approximately 1.2 seconds.

A secondary mode may not use the ROIs and instead adjust the exposure based on a metering of the general scene. This mode should be generally stable and allow little flickering or quick exposure adjustments. This mode may be entered when there are no significant ROIs detected or the ROIs that are detected are too small to be considered. A hysteresis on the size of the ROIs can be used such that once in the secondary mode, a larger or more significant ROI is needed than is necessary when not in this mode in order to exit the secondary mode and return to the metered ROI mode as described above.

Figure 7:
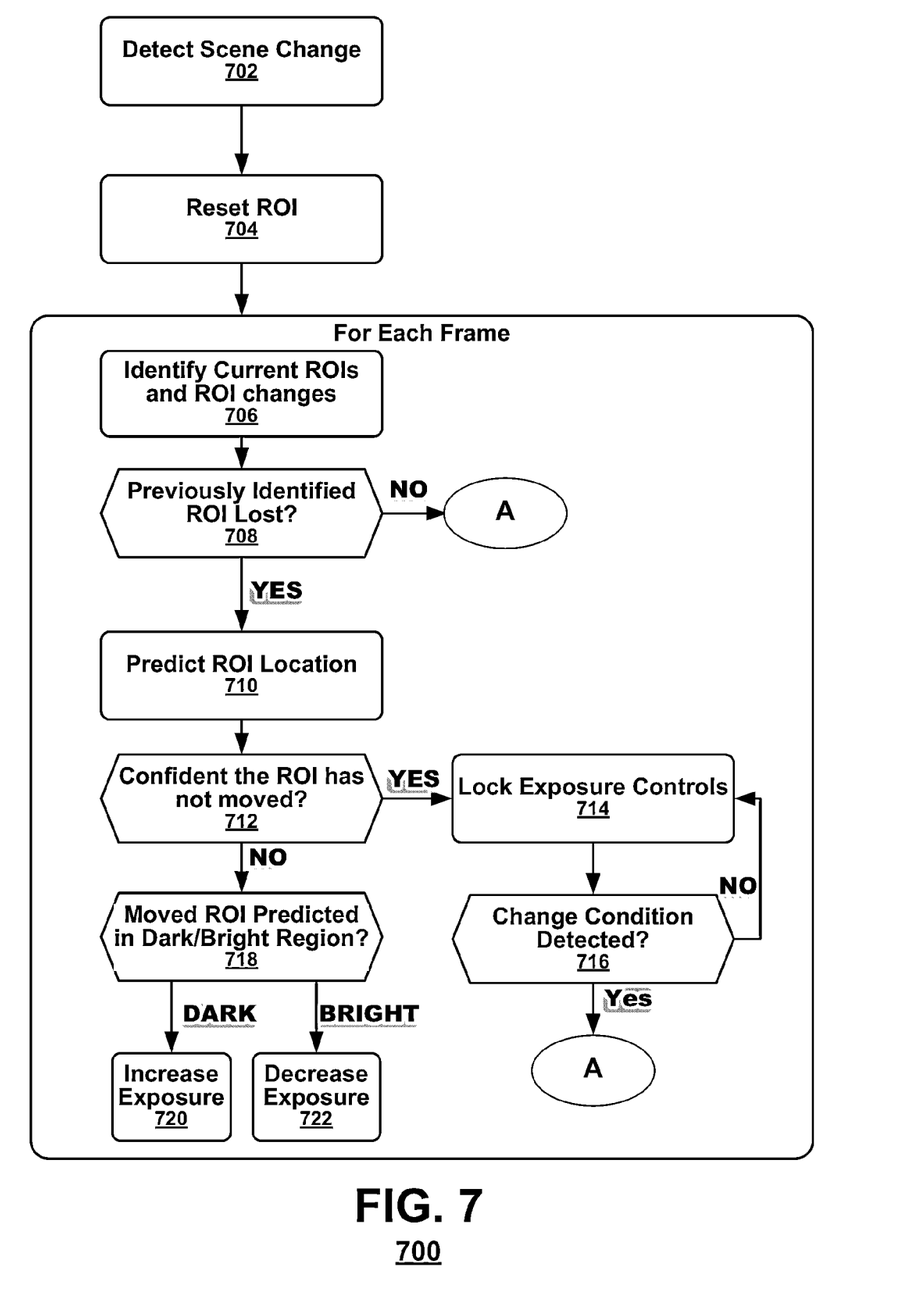
FIG. 7 is a simplified flow diagram illustrating a method for adjusting exposure settings according to an embodiment of the present invention.

FIG. 7 is a simplified flow diagram illustrating a method 700 for adjusting exposure settings when a previously identified ROI is lost according to an embodiment of the present invention. A change in a previously identified ROI may be communicated to a controller and the controller may adjust the parameters of a camera as described above in the discussion pertaining to FIG. 2. According to an embodiment, a parameter adjusted may be a sensitivity threshold of an auto exposure function of the camera. When a new scene is detected at a source camera (box 702), the identified ROI(s) and metered area information may be reset (box 704). Then for a first frame, the ROIs may be identified or set to a default, for example, the center of the frame. Thereafter, for each frame in the scene, the ROIs may be identified and the position of the current ROIs may be compared to the location of previously identified ROIs to identify ROI changes (box 706). If an ROI that was part of the metered area has been lost (box 708), the location of the lost ROI may be predicted (box 710). If the ROI was previously stable, and the confidence in the ROI location is otherwise high (712), then the ROI may be predicted to have remained consistent and the ROI and the exposure controls may be locked (box 714). When the exposure controls are locked, the location of the metered area may move, but the auto exposure will not be adjusted until a change condition is detected (box 716). If a change condition is not detected, the exposure controls remain locked (box 714). If the change condition is detected, the exposure controls may be unlocked and the exposure settings changed as described in the discussion pertaining to FIG. 8 below. However, if there is low confidence that the ROI has remained stable, the lost ROI may have moved to an area of the frame in which it is hard to distinguish the ROI. If the predicted new area is too dark (box 718), then the exposure of the camera may be increased to brighten the dark region and reveal the ROI (box 720). If the predicted new area is too bright (box 718), then the exposure of the camera may be decreased to lessen the light on the over exposed area and reveal the ROI (box 722).

Figure 8:
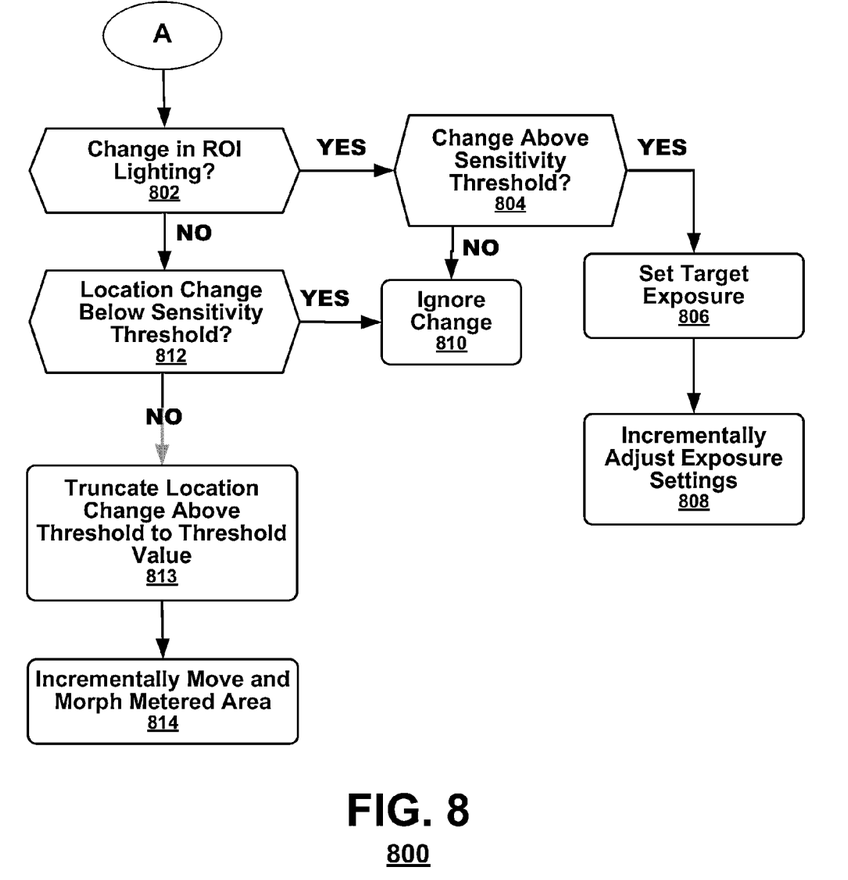
FIG. 8 is a simplified flow diagram illustrating a method for adjusting exposure settings according to an embodiment of the present invention.

FIG. 8 is a simplified flow diagram illustrating a method 800 for adjusting the camera exposure settings responsive to a change in the frame conditions according to an embodiment of the present invention. A change in frame conditions may be communicated to a controller and the controller may adjust the parameters of a camera as described above in the discussion pertaining to FIG. 2. According to an embodiment, a parameter adjusted may be a sensitivity threshold of an auto exposure function of the camera. When a change in ROI or scene lighting conditions is detected, the auto exposure settings may be adjusted to accommodate the change. If the detected change includes a change in detected lighting conditions or brightness (box 802) which is above a sensitivity threshold (box 804), a target exposure level may be set (box 806) and the exposure settings may be gradually adjusted to achieve the new target exposure (box 808). Exposure changes may not be implemented if the detected change is below a sensitivity threshold (box 810). Small changes may be ignored in order to maintain the stability of the settings and avoid unnecessary intra-coding. If the detected change includes a change in the location of the priority ROI and the change is above a sensitivity threshold (box 812), the location change may be truncated and set to a value which is equal to the threshold (813), and the metered area may be gradually adjusted to accommodate the new location (box 814). Location changes may not be implemented if the detected change is below a sensitivity threshold (box 810). If a significant change in priority ROI occurs, the metered area may be moved and morphed as described with reference to FIG. 6 above to gradually adjust the exposure priority.

If a significant change in lighting occurs (box 804), the target exposure may be determined using a set of predetermined incremental changes. Then when the significant change is detected, the target exposure may be set to the next increment for the exposure settings, either to brighten the scene or reduce exposure for an overly bright scene. Alternatively, the target exposure may be calculated based on the current exposure settings and the size of the significant change. However, in some cases, a detected significant change in lighting conditions may be misleading, for example, when the ROI was focused on a bright light or black surface. Then an exposure adjustment may be inappropriate for the image as a whole. Therefore, the target exposure may be set taking additional scene, image or camera data into consideration. Detection of the misleading significant change may be based on a number of factors including camera metadata such as brightness and signal to noise ratio, the coloring or luminance of the scene's objects, the amount of lighting in the scene, and/or the specific scene type.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 1 illustrates the components of video coders and video decoders as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders typically will include functional units in addition to those described herein, including audio processing systems, buffers to store data throughout the coding pipelines as illustrated and communication transceivers to manage communication with the communication network and a counterpart decoder device. Such elements have been omitted from the foregoing discussion for clarity.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A video coding method, comprising:
   estimating brightness of frames of video output from a camera having auto exposure control;
   estimating a rate of brightness change among the frames;
   when the rate of change is lower than a predetermined threshold, reducing a sensitivity of the auto exposure control to detected changes in exposure conditions; and
   predictively coding frames of the video output from the camera after the reducing of the sensitivity of the auto exposure control.

2. The method of claim 1, wherein the auto exposure control compares detected changes in exposure conditions to a threshold based on the sensitivity to determine whether to change auto exposure settings.

3. A video coding method, comprising:
   detecting a change in at least one of motion, image complexity, and bandwidth associated with frames of video output from a camera having auto exposure control;
   if the detected change is one of above and below a predetermined threshold, adjusting a sensitivity of the auto exposure control to detected changes in exposure conditions; and
   predictively coding frames of the video output from the camera after the adjusting of the sensitivity of the auto exposure control.

4. The method of claim 3, wherein the sensitivity of the auto exposure control is increased when the detected change is an increase in bandwidth, and the sensitivity of the auto exposure control is decreased when the detected change is a decrease in bandwidth.

5. The method of claim 3, wherein the sensitivity of the auto exposure control is decreased when the detected change is an increase in image complexity, and the sensitivity of the auto exposure control is increased when the detected change is a decrease in image complexity.

6. The method of claim 3, wherein the sensitivity of the auto exposure control is increased when the detected change is an increase in motion, and the sensitivity of the auto exposure control is decreased when the detected change is a decrease in motion.

7. The method of claim 3, wherein the auto exposure control compares detected changes in exposure conditions to a threshold based on the sensitivity to determine whether to change auto exposure settings.

8. A video coding method, comprising:
   identifying regions of interest from at least one frame in a video sequence;
   prioritizing the regions of interest;
   identifying a metered area, wherein the metered area encompasses at least a portion of an identified region of interest with a highest priority;
   determining a confidence level indicating whether the identified region of interest is stationary;
   setting exposure settings of a camera based on the metered area and the confidence level;
   capturing a frame based on the exposure settings; and
   predictively coding the frame.

9. The method of claim 8, further comprising:
   if the confidence level is above a threshold, locking the exposure settings.

10. The method of claim 8, further comprising:
    detecting a change in lighting of the region of interest; and
    if the change in lighting is above a threshold, adjusting the exposure settings until a target exposure level is reached.

11. The method of claim 8, further comprising:
    detecting a change in location of the region of interest; and
    if the change in location is above a threshold, moving the metered area.

12. The method of claim 8, further comprising:
    if the confidence level is below a threshold, determining a new location of the region of interest; and
    moving the metered area to encompass at least a portion of the region of interest.

13. The method of claim 12, wherein the metered area is gradually moved over a plurality of transition frames.

14. A coding apparatus, comprising:
    a camera having auto exposure control to capture and output frames of video;
    a pre-processor to estimate brightness of the frames of video output from the camera;
    a controller to:
       estimate a rate of brightness change among the frames, and
       when the rate of change is lower than a predetermined threshold, reduce a sensitivity of the auto exposure control to detected changes in exposure conditions; and
    a coding engine to predictively code frames of the video output from the camera after the reducing of the sensitivity of the auto exposure control.

15. The apparatus of claim 14, wherein the auto exposure control compares detected changes in exposure conditions to a threshold based on the sensitivity to determine whether to change auto exposure settings.

16. A coding apparatus, comprising:
a camera having auto exposure control to capture and output frames of video;
a pre-processor to detect a change in at least one of motion and image complexity associated with the frames of the video output from the camera;
a controller to adjust a sensitivity of the auto exposure control to detected changes in exposure conditions when the detected change in at least one of motion and image complexity is one of above and below a predetermined threshold; and
a coding engine to predictively code frames of the video output from the camera after the adjusting of the sensitivity of the auto exposure control.

17. The apparatus of claim 16, wherein the sensitivity of the auto exposure control is decreased when the detected change is an increase in image complexity, and the sensitivity of the auto exposure control is increased when the detected change is a decrease in image complexity.

18. The apparatus of claim 16, wherein the auto exposure control compares detected changes in exposure conditions to a threshold based on the sensitivity to determine whether to change auto exposure settings.

19. A coding apparatus, comprising:
a camera having auto exposure control to capture and output frames of video;
a pre-processor to detect a change in motion associated with the frames of the video output from the camera;
a controller to adjust a sensitivity of the auto exposure control to detected changes in exposure conditions when the detected change in at least one of motion and image complexity is one of above and below a predetermined threshold, wherein the sensitivity of the auto exposure control is increased when the detected change is an increase in motion, and the sensitivity of the auto exposure control is decreased when the detected change is a decrease in motion; and
a coding engine to predictively code the video.

20. A coding apparatus, comprising:
a camera having auto exposure control to capture and output frames of video;
a transmitter to detect a change in bandwidth;
a controller to adjust a sensitivity of the auto exposure control to detected changes in exposure conditions when the detected change in bandwidth is one of above and below a predetermined threshold; and
a coding engine to predictively code the video.

21. The apparatus of claim 20, wherein the sensitivity of the auto exposure control is increased when the detected change is an increase in bandwidth, and the sensitivity of the auto exposure control is decreased when the detected change is a decrease in bandwidth.

22. The apparatus of claim 20, wherein the auto exposure control compares detected changes in exposure conditions to a threshold based on the sensitivity to determine whether to change auto exposure settings.

23. A coding apparatus, comprising:
a camera to capture and output frames of video;
a pre-processor to:
identify regions of interest from at least one frame in the video,
prioritize the regions of interest, and
identify a metered area, wherein the metered area encompasses at least a portion of an identified region of interest with a highest priority;
determine a confidence level indicating whether the identified region of interest is stationary;
a controller to set exposure settings of the camera based on the metered area and the confidence level; and
a coding engine to predictively code a frame captured by the camera based on the exposure settings.

24. The apparatus of claim 23, wherein the pre-processor is further configured to lock the exposure settings if the confidence level is above a threshold.

25. The apparatus of claim 23, wherein the pre-processor is further configured to detect a change in lighting of the region of interest, and the controller is further configured to, if the change in lighting is above a threshold, adjust the exposure settings until a target exposure level is reached.

26. The apparatus of claim 23, wherein the pre-processor is further configured to detect a change in location of the region of interest, and if the change in location is above a threshold, move the metered area.

27. The apparatus of claim 23, wherein the pre-processor is further configured to determine a new location of the region of interest if the confidence level is below a threshold, and move the metered area to encompass at least a portion of the region of interest.

28. The apparatus of claim 27, wherein the metered area is gradually moved over a plurality of transition frames.

29. A storage device storing program instructions that, when executed by a processor, cause the processor to:
estimate brightness of frames of video output from a camera having auto exposure control;
estimate a rate of brightness change among the frames;
when the rate of change is lower than a predetermined threshold, reduce a sensitivity of the auto exposure control to detected changes in exposure conditions; and
predictively code frames of the video output from the camera after the reducing of the sensitivity of the auto exposure control.

30. The storage device of claim 29, wherein the auto exposure control compares detected changes in exposure conditions to a threshold based on the sensitivity to determine whether to change auto exposure settings.

31. A storage device storing program instructions that, when executed by a processor, cause the processor to:
detect a change in at least one of motion, image complexity, and bandwidth associated with frames of video output from a camera having auto exposure control;
if the detected change is one of above and below a predetermined threshold, adjust a sensitivity of the auto exposure control to detected changes in exposure conditions; and
predictively code frames of the video output from the camera after the adjusting of the sensitivity of the auto exposure control.

32. The storage device of claim 31, wherein the auto exposure control compares detected changes in exposure conditions to a threshold based on the sensitivity to determine whether to change auto exposure settings.

33. A storage device storing program instructions that, when executed by a processor, cause the processor to:
identify regions of interest from at least one frame in a video sequence;
prioritize the regions of interest;
identify a metered area, wherein the metered area encompasses at least a portion of an identified region of interest with a highest priority;
determine a confidence level indicating whether the identified region of interest is stationary;

set exposure settings of a camera based on the metered area and the confidence level;
capture a frame based on the exposure settings; and
predictively code the frame.

* * * * *